Oct. 31, 1967     A. PALACIOS     3,349,626
BUBBLE BALANCING MACHINE TO BALANCE
TIRES — TIRE BALANCING PLATE
Filed Jan. 25, 1965
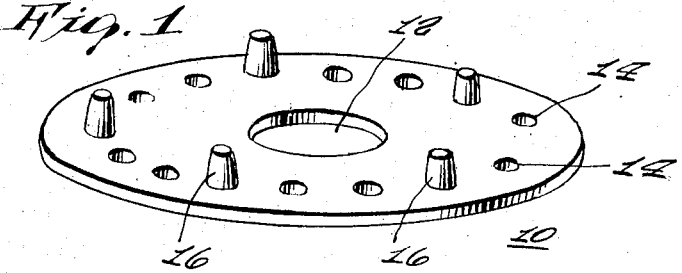
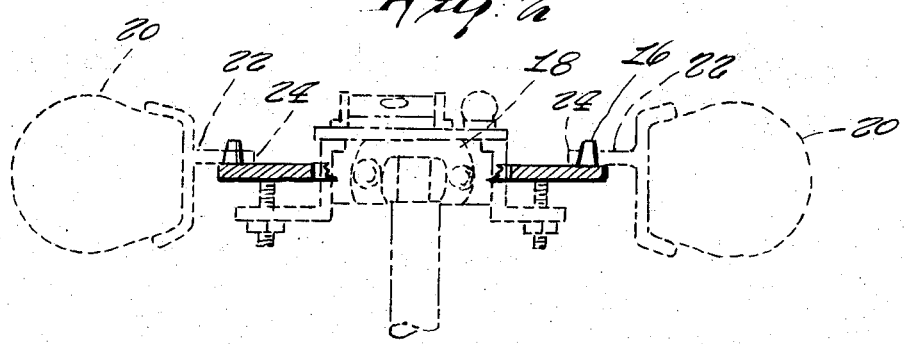
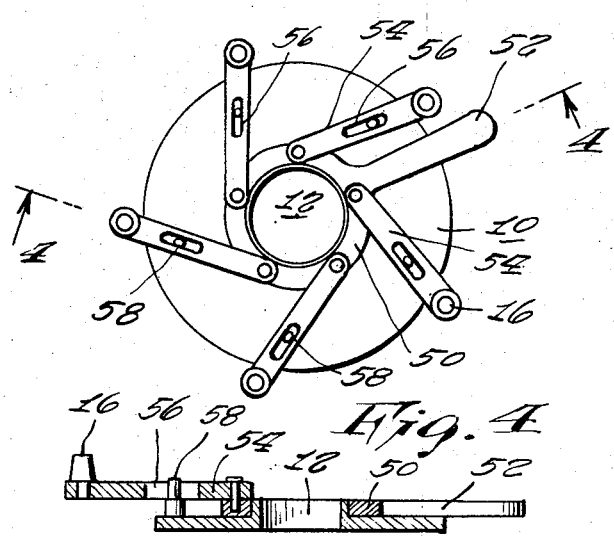
INVENTOR.
AMANDO PALACIOS

United States Patent Office 3,349,626
Patented Oct. 31, 1967

3,349,626
BUBBLE BALANCING MACHINE TO BALANCE
TIRES—TIRE BALANCING PLATE
Amando Palacios, 4167 Stafford St.,
Corpus Christi, Tex. 78416
Filed Jan. 25, 1965, Ser. No. 427,862
1 Claim. (Cl. 73—487)

ABSTRACT OF THE DISCLOSURE

A tire balancing plate for use on a bubble balancing machine to balance tires including a ring rotatably mounted on said plate, a plurality of spaced levers pivotally secured at one end to said ring, each of said levers terminating outwardly in an upstanding prong, means to secure said levers to said plate and extend the same, said prongs inserting into corresponding lug holes in said tire to support the same.

My invention is directed toward a plate for supporting automobile tires mounted on wheels on a tire balancing machine whereby the tires can be balanced easily.

It is an object of my invention to provide a new and improved tire balancing plate which is adapted to be readily connected to a wheel supporting a tire for ease of use on a tire balancing machine and which can be subsequently disconnected from the machine and wheel without the use of nuts or bolts or similar connection means between plate and wheel.

Another object of my invention is to provide a new and improved tire balancing plate of the character indicated which can be manufactured easily and inexpensively.

All of the foregoing and still further objects and advantages of my invention will now be explained with reference both to this specification and to the drawings wherein:

FIG. 1 is a perspective view of one embodiment of my invention.

FIG. 2 is a side view showing the embodiment of FIG. 1 in use on a tire balancing machine.

FIG. 3 is a plan view of a second embodiment of my invention.

FIG. 4 is a cross-section through 4—4 of FIG. 1.

Referring now to FIGS. 1 and 2, there is shown a flat steel plate identified generally at 10 and having a central hole 12 and a plurality of peripherally disposed small holes 14 with a plurality of upstanding prongs 16 also peripherally disposed on the plate and positioned between holes 14.

In use, plate 10 is positioned over the top bracket 18 of a tire balancing machine and is bottled thereto by bolts which are secured to the bracket and extend through selective ones of holes 14. Bracket 18 extends through the central hole 12 of plate 10. A tire 20 mounted on a wheel 22 having a hub 24 with holes is mounted over the plate with prongs 16 extending upward through the hub holes as a detachable but first support.

Alternatively as shown in FIGS. 3 and 4, a rotatable ring 50 rotatable in hole 12 of plate 10 can be turned by handle 52. The prongs 16 are no longer secured directly to the plate but rather extend upward from the free ends of levers 54 pivotally secured at their other ends to rings 50. Each lever has a slot 56 through which a pin 58 mounted on the plate and extending upward therefrom extends whereby the handle can be rotated without changing the position of prongs 16.

While I have described my invention with particular reference to the drawings, my protection is to be limited only by the terms of the claim which follows.

I claim:

A plate for supporting a wheel having a tire and a plurality of lug holes for use on a balancing machine having a support bracket mounted at the top of said machine, said plate comprising a thin flat circular disc including an integrally formed and upwardly extending bushing, a large central hole in said plate adapted to accommodate said bracket, a ring rotatably mounted on said bushing, a handle secured to said ring, a plurality of levers pivotally secured at one end to said ring at spaced apart positions, the other end of each lever carrying an upstanding prong, each lever having a slot intermediate its ends and extending in the same direction as the lever, said plate having a like plurality of upstanding pins, each pin extending upward through a corresponding slot, said prongs extending upward through selected lug holes whereby said tire is supported for balancing.

References Cited

UNITED STATES PATENTS

| | | | |
|---|---|---|---|
| 2,178,101 | 10/1939 | Hatch | 144—288 |
| 2,351,355 | 6/1944 | Merrett | 144—288 |
| 2,589,456 | 3/1952 | Tinkham | 73—483 |
| 2,764,194 | 9/1956 | Schultz | 144—288 |
| 3,045,497 | 7/1962 | Lackie | 73—485 XR |
| 3,143,327 | 8/1964 | Watt | 73—485 XR |

FOREIGN PATENTS 517,553   3/1955   Italy.

JAMES J. GILL, *Primary Examiner.*